Figure 1:
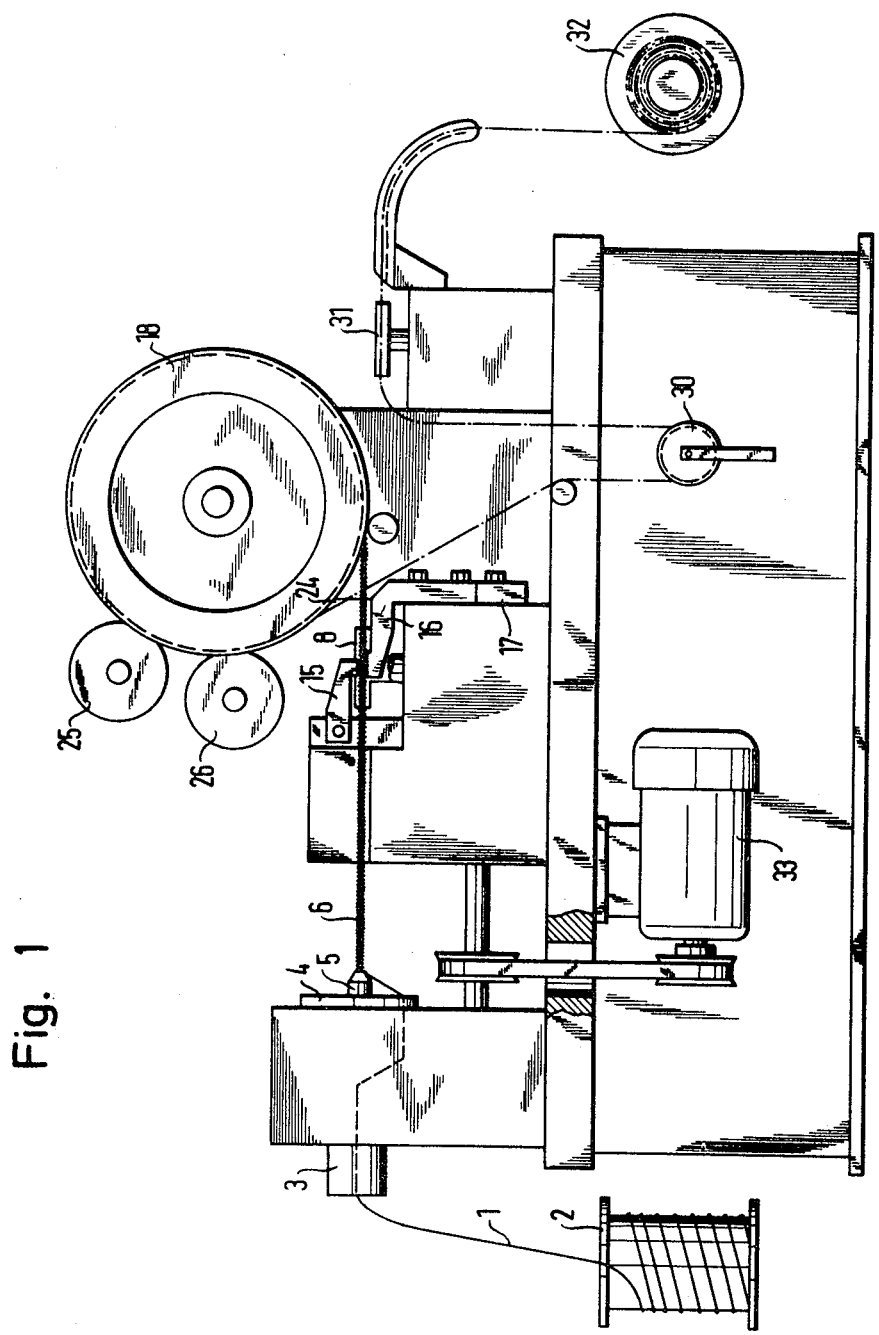

United States Patent

Popovitsch

[15] 3,666,853
[45] May 30, 1972

[54] METHOD OF MANUFACTURING A CONTINUOUS STRINGER FOR A SLIDING CLASP FASTENER

[72] Inventor: Ernst Popovitsch, Stuttgart-Steckfeld, Germany

[73] Assignee: Dr. Karl F. Nagele Feinmaschinenbau, Stuttgart-Hohenhein, Germany

[22] Filed: Apr. 30, 1970

[21] Appl. No.: 33,469

[30] Foreign Application Priority Data

May 2, 1969 Germany ..................P 19 22 605.2

[52] U.S. Cl. ...................264/281, 264/320, 264/DIG. 40
[51] Int. Cl. .....................................................B29c 17/02
[58] Field of Search..............264/281, 320, DIG. 40; 18/12, 18/19 C

[56] References Cited

UNITED STATES PATENTS 3,077,001  2/1963  Yoshida...................................18/19 C
3,197,537  7/1965  Hansen....................................18/19 C X
3,337,672  8/1967  Steingrubner.............................264/281

FOREIGN PATENTS OR APPLICATIONS 1,080,321  8/1967  Great Britain.................264/DIG. 40

Primary Examiner—Robert F. White
Assistant Examiner—Richard Shear
Attorney—Kelman and Berman

[57] ABSTRACT

In manufacturing a continuous slide fastener stringer, a plastic wire is coiled into a helix abut a fixed mandrel, and the helix is withdrawn from the mandrel while its convolutions are braked on one side so that the helix is distorted. It is thereafter shaped on a heated spacing wheel, and each convolution is deformed by a toothed kinking disc. The stringer so formed has convolutions of periodically varying inclination and has alternating parallel shanks connected by inclined portions retaining the original coiling pitch and having protuberances which secure loops of sewing threads by means of which the stringer is attached to a supporting tape.

5 Claims, 8 Drawing Figures

Patented May 30, 1972

3,666,853

3 Sheets-Sheet 1

INVENTOR:
Ernst Popovitsch
BY: Kelman and Berman
Agents

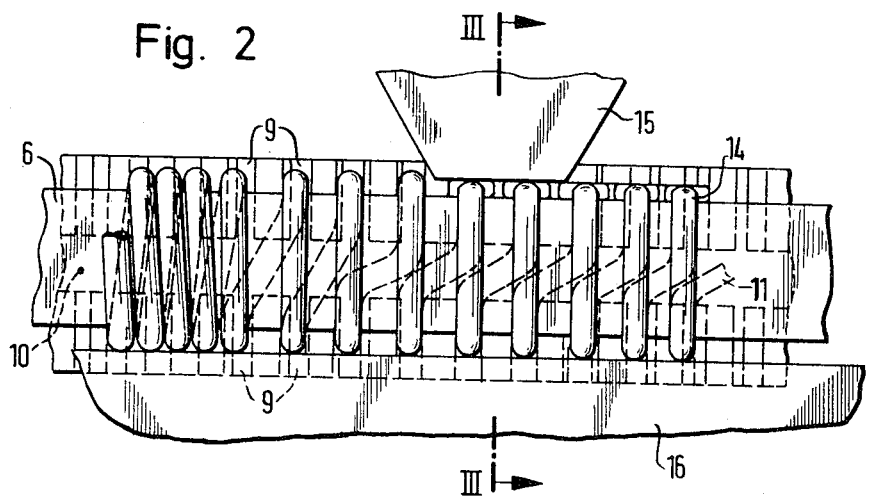
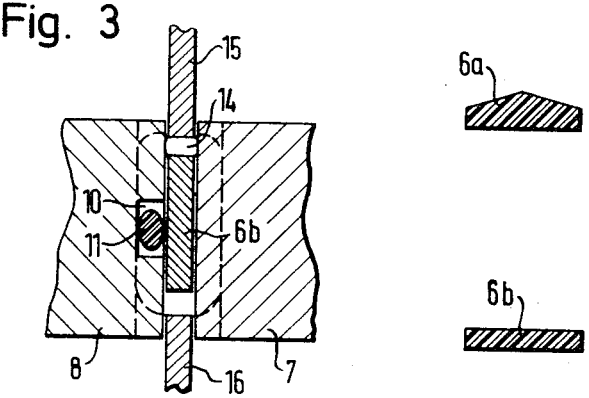
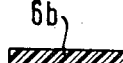
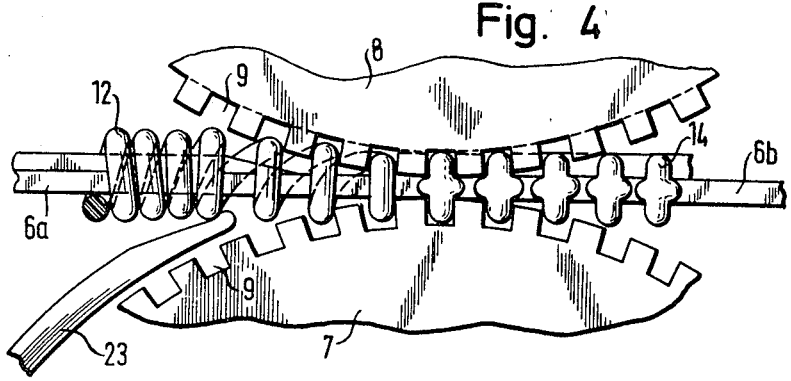
INVENTOR:
Ernst Popovitsch

INVENTOR:
Ernst Popovitsch
BY: Kelman and Berman
Agents

METHOD OF MANUFACTURING A CONTINUOUS STRINGER FOR A SLIDING CLASP FASTENER

The present invention relates to a method of manufacturing a continuous stringer for a sliding clasp fastener from a shaped strand of a plastics material coiled into a helix, which has a periodically varying angle of inclination, being coiled continuously on a fixed mandrel and subsequently withdrawn therefrom.

The construction of such a stringer, which comprises a plurality of fastener elements joined by interconnecting portions and made from a filament that is basically coiled, preferably into the shape of a helix, necessitates a particularly strong deformation, which exceeds the amount at present usual for making such stringers.

It is known to manufacture sliding clasp fastener stringers from a plastics material in the shape of deformed helices in such a manner that, after coiling the material into a helix having an approximately regular angle of inclination, the parts of the stringer adjacent the coupling surfaces formed thereon can be made approximately without inclination by the insertion of curved cylinders, cams, or profiled and heated wheels so that the connections between the individual coupling elements of the stringer, i.e. the inclined parts or portions, are located in the rearward area of the helix facing the coupling surfaces. Should, however, the inclined parts which connect the coupling elements together not run in the rearward region of the helix actually inclined to its longitudinal axis, but in the central area of the elements, i.e. between the front and rear reverse turn of the profiled strand, the known deformation measures are not sufficient for economic manufacture. More particularly, it was not possible, with the hitherto known methods and apparatus for deforming stringers, to construct these interconnecting parts so that they extend from loop to loop approximately parallel to the longitudinal axis of the row of elements in the form of cross-pieces.

It is an object of the present invention to bring about by simple means, a particularly strong deformation of a helix into a closed shape, preferably of the described configuration. It is a further object to bring about, also by simple means, the withdrawal of the coiled plastics strand from a fixed mandrel and, at the same time, to preform the stringer.

The invention consists, therefore, in a method of manufacturing a continuous sliding clasp fastener stringer from a shaped strand of a suitable plastics material coiled into a helix, which has a periodically varying angle of inclination, being coiled continuously on a fixed mandrel and subsequently withdrawn therefrom, wherein, in the withdrawal zone, the convolutions are braked at one side and withdrawn at the other side in the area of a cross-sectional reduction of the mandrel and are preformed during formation of the individual elements and the element-interconnecting portions retaining the convolution spacing, the amount of the decrease in cross-section at one side corresponding approximately to the longitudinal distortion of the stringer elements, and wherein the stringer is fed after the free end of the mandrel into a heated shaping wheel having peripheral recesses to receive the elements and also pins engageable therein, the helix being permanently deformed by means of at least one toothed disc operable on the inclined connecting portions, said connecting portions being applied against said pins of the shaping wheel by said toothed disc or discs in such a manner that the completed connecting portions run approximately parallel to the longitudinal axis of the stringer.

Preferably, the stringer is initially coiled into a helix by means of a thread guide rotatable about the fixed mandrel and said mandrel is secured in a magnetically heated coiling head. Furthermore, the stringer is provided with coupling surfaces in the area of the preforming toothed wheels by means of an intermittently operable stamping die.

Advantageously, at the lagging supported bent positions of the inclined portions, there is formed a protuberance projecting towards the support.

Figure 7:
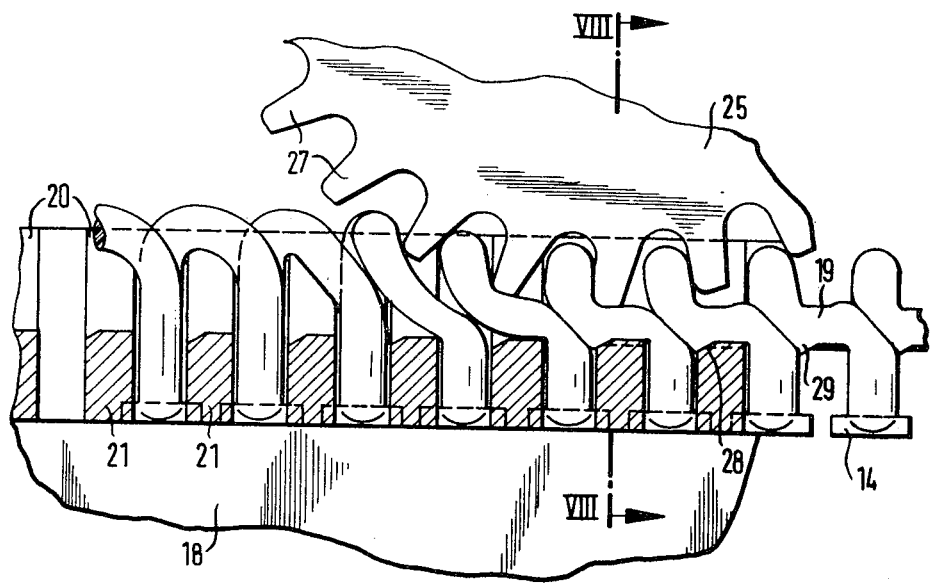
Figure 8:
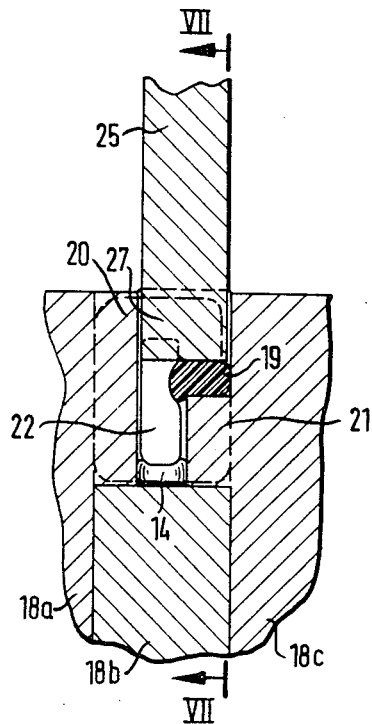

In order that the invention may be more clearly understood, reference will now be made to the accompanying drawings which show certain aspects thereof by way of example, and in which:

FIG. 1 shows a side view of a complete apparatus,

FIG. 2 shows a side view of a part of the apparatus being used for withdrawing the helically shaped stringer for deforming and stamping, part of the apparatus being removed to make the showing clearer, FIG. 3 shows a section through the stamping device along the line III—III of FIG. 2, FIG. 4 shows a plan view of part of the apparatus according to FIG. 2, FIGS. 5 and 6 show cross-sections through various parts of the coiling mandrel, FIG. 7 shows a section along the line VII—VII of FIG. 8 made at right angles to the axis of rotation through the periphery, shown in development of the heated shaping wheel having a toothed wheel in engagement therewith, and FIG. 8 shows a section along the line VIII—VIII of FIG. 7.

Referring now the drawings, a shaped strand 1 of a suitable thermoplastic material is drawn off a feed spool 2 and fed into a magnetically heated winding head 3, in a stationary part 5 of which is secured a coiling mandrel 6. The plastics filament 1 is fed through a rotating ring 4 of the winding head 3 and wound into a helix about the fixed winding mandrel 6. The convolutions thrust themselves forward and arrive between preforming wheels 7 and 8 (FIG. 4). These latter are peripherally provided with transverse gaps 9 at predetermined intervals depending upon the desired spacing of the fastener elements. A gap is provided between the preforming wheels 7 and 8 which corresponds only to the width of the coiling mandrel 6 at its end 6b which is tapered. Thus, the tapered end 6b of the mandrel is supported from opposite sides, while the coil passes through and the arrangement ensures a diametrical pressure on the convolutions thus assisting in forming coupling surfaces 14, as the helix passes between the wheels.

The effective stamping of the coupling surfaces 14, however, also necessitates a stamping die 15 (FIGS. 1 and 2). An adjustable backing block 16 which covers considerably more windings than the stamp die 15, supports the stamping pressure and also the mandrel at 6b. By adjusting the backing block 16 by means of an eccentric disc 17, the height of the coupling surfaces 14 can be adjusted to any desired degree. Since the coupling surface 14 is stamped before the fixing operation, i.e. before the helix enters into a heated wheel or drum 18, the amount of material which is needed for the inclined portion 11 or 19 connecting the fastener elements have to be taken into account during the stamping operation. This extra material is made available during winding, due to the cross-sectional shape of the thicker part 6a of the mandrel. The mandrel is tapered at 6b to a decreased cross-section in the reception area of the preforming wheels 7 and 8. An annular groove 10 in the preforming wheel 8 offers room for the connecting portion 11 (FIG. 2) as yet lying at an oblique angle. A resilient pointed braking member 23 presses the convolutions of the helix 12 in the direction of the preforming wheel 8, so that they are engaged first by the preforming wheel 8. By this arrangement, moreover, the convolution is slightly offset so that its diametrical portion facing the preforming wheel 7 can engage therein more efficiently and without error.

The preforming so achieved, with the obliquely inclined portions 11, is not permanent since the material can still spring back.

The end 6b of the winding mandrel leads tangentially into the heated shaping wheel or drum 18. This latter consists of discs 18a, 18b and 18c (FIG. 8). The disc 18a is provided with cross-pieces 20 whose distance from one another corresponds exactly to the desired spacing of the elements in the finished fastener. The cross-pieces 20 are of the same height as the stringer. The disc 18c has pins 21, which correspond to the spacing of the disc 18a, but are only as high as the inclined portions 19 of the stringer allow. The base of an annular groove 22 formed between the discs 18a and 18c is formed by the peripheral surface of the central disc 18b. This groove receives the end 6b of the mandrel and also the coupling surfaces 14. It also offers space for the stripper 24.

The ultimate shape and direction of the connecting portions 19 is achieved in the heated shaping wheel 18. To this end, toothed discs 25 and 26 are arranged on the periphery of the heating wheel 18. These latter have teeth 27, which run synchronously with the pins 21. The inclined portion 19 is formed and directed between the teeth 27 and the pins 21. Slightly inclined surfaces 28 on the pins 21 effect formation of a protuberance 29 on the inclined portions 19 of the stringer. This latter offers the advantage that when loading the stringer sewn to its carrier tape, the seam cannot slip. The protuberance 29 is also used for anchoring the sewing thread.

An exact shape and direction of the inclined portion 19 connecting the elements can best be achieved by re-rolling, by means of additional toothed discs similar to 25, 26, one behind the other. The shape of the teeth 27 then differs from disc to disc. The teeth 27 of the first disc 25 are slender and pointed and those of the last one 26 rather blunt.

The stringer is withdrawn from the heated wheel by means of a stripper 24. At the exit point, the stringer is initially cooled by a stream of air, ensuring the correct spacing of the elements of the stringer. Complete cooling of the stringer is effected in the open air. It is advantageous to apply a slight stress by a light roller 30 for this purpose, so that twisting is avoided as far as possible. In order to decrease or remove the twist on a finished fastener, it is advisable to coil one stringer of the fastener, for example, to the right and the other to the left.

It has proven advantageous to double up the machines side by side, for which purpose a stringer closing device 31 is provided at the end of the machines to draw both the produced stringers together to form a completed chain. This has the advantage that complete cooling off can result in the closed position of the two cooperating strings and the tensions within the stringers compensate each other. The finished chain is either wound on a spooling member 32 under slight stress or the chain can be fed back into a container from which it is removed for sewing on to the tapes. All movable parts of the machine are driven by an adjustable motor and run in synchronism.

What we claim is:

1. A method of manufacturing a continuous sliding clasp fastener stringer from a shaped strand of plastics material which comprises:
    a. continuously coiling said strand on a fixed elongated mandrel to form a helix having a plurality of convolutions,
        1. said mandrel having a terminal portion of reduced cross section defining a withdrawing zone;
    b. applying force longitudinally of said mandrel to one part of each convolution in said withdrawing zone;
    c. simultaneously applying force to another part of said convolution to brake said withdrawing,
        1. said forces being sufficient to withdraw said convolutions from said mandrel and to deform each convolution into a first portion having a greater angle of inclination and a second portion having a smaller angle of convolution, said second portions being interconnected by said first portions,
        2. whereby said helix is given a periodically varying angle of inclination and constitutes an elongated stringer, said second portions constituting stringer elements;
    d. feeding said stringer from said mandrel to a heated spacing wheel,
        1. said wheel having a plurality of peripheral recesses respectively receiving said elements and a plurality of pins; and
    e. engaging each of said first portions between a tooth of a toothed disc and a pin of said wheel under a pressure sufficient to bend said first portion substantially parallel to the longitudinal axis of said stringer.

2. A method as set forth in claim 1, wherein said strand is coiled on said mandrel by passing the strand through a thread guide while said thread guide rotates about said mandrel and said mandrel is secured in a heated coiling head.

3. A method as set forth in claim 1, wherein said second portions of said convolutions are engaged by a reciprocating stamping die with a force sufficient to form a coupling surface on each second portion prior to said withdrawing.

4. A method as set forth in claim 3, wherein said plastic material is thermoplastic, and said stringer is being cooled after said engaging of each of said first portions between said tooth and said pin.

5. A method as set forth in claim 4, wherein said pressure is sufficient to form a protuberance on said first portion.

* * * * *